(12) United States Patent
Huang et al.

(10) Patent No.: US 11,733,489 B2
(45) Date of Patent: Aug. 22, 2023

(54) FIVE-PIECE INFRARED SINGLE WAVELENGTH LENS SYSTEM

(71) Applicant: NEWMAX TECHNOLOGY CO., LTD., Taichung (TW)

(72) Inventors: Ching-Yun Huang, Taichung (TW); Chi-Chang Wang, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 423 days.

(21) Appl. No.: 17/035,694

(22) Filed: Sep. 29, 2020

(65) Prior Publication Data

US 2022/0099930 A1   Mar. 31, 2022

(51) Int. Cl.
*G02B 13/00* (2006.01)
*G02B 9/60* (2006.01)

(52) U.S. Cl.
CPC .......... *G02B 13/0045* (2013.01); *G02B 9/60* (2013.01); *G02B 13/008* (2013.01)

(58) Field of Classification Search
CPC .... G02B 13/0045; G02B 9/60; G02B 13/008; G02B 13/18; G02B 9/62; G02B 9/64; G02B 7/021; G02B 5/208; G02B 13/14
See application file for complete search history.

(56) References Cited

U.S. PATENT DOCUMENTS 10,564,396 B2 * 2/2020 Tsai .................. G02B 9/60

FOREIGN PATENT DOCUMENTS

CN    111367054 A  *  7/2020

\* cited by examiner

*Primary Examiner* — William Choi
*Assistant Examiner* — Ray Alexander Dean
(74) *Attorney, Agent, or Firm* — Bruce Stone LLP; Joseph A. Bruce

(57) ABSTRACT

A five-piece infrared single wavelength lens system includes, in order from the object side to the image side: a first lens element with a negative refractive power, a stop, a second lens element with a positive refractive power, a third lens element with a negative refractive power, a fourth lens element with a positive refractive power, and a fifth lens element with a negative refractive power, where a radius of curvature of an object-side surface of the third lens element is R5, a central thickness of the third lens element along an optical axis is CT3, and they satisfy the relation: $5<R5/CT3<35$. Such a system has a wide field of view, large stop, short length and less distortion.

14 Claims, 10 Drawing Sheets

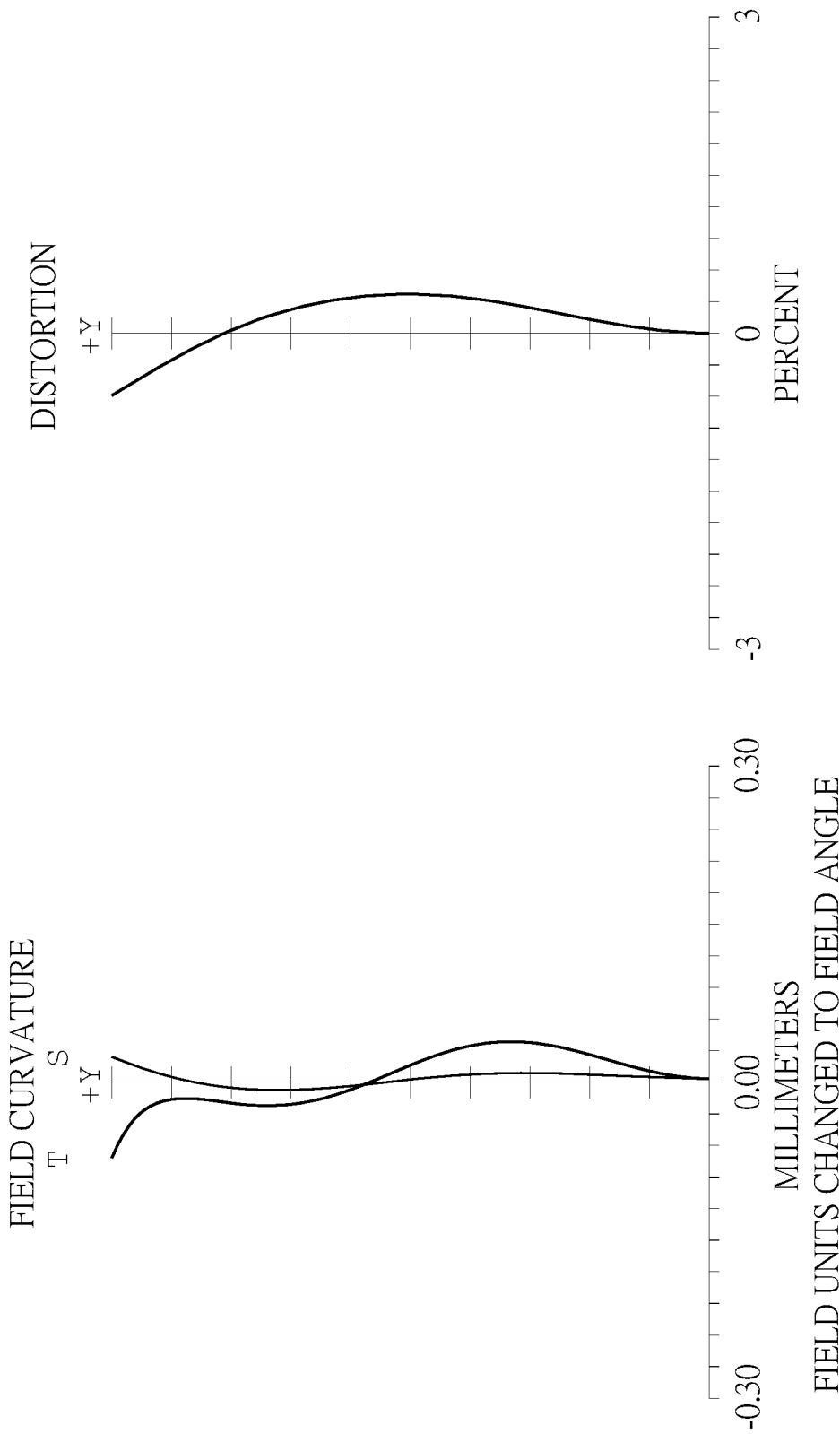

FIVE-PIECE INFRARED SINGLE WAVELENGTH LENS SYSTEM

BACKGROUND

Field of the Invention

The present invention relates to a lens system, and more particularly to a miniaturized five-piece infrared single wavelength lens system applicable to electronic products.

Description of the Prior Art

Nowadays digital imaging technology is constantly innovating and changing, in particular, digital carriers, such as, digital camera and mobile phone and so on, have become smaller in size, so CCD (Charge Coupled Device) or CMOS (Complementary Metal Oxide Semiconductor) sensor is also required to be more compact. In addition to be used in the field of photography, in recent years, infrared focusing lens has also be used in infrared receiving and sensing field of the game machine, and in order to make the scope of game machine induction user more broader, wide-angle lens group has become the mainstream for receiving infrared wavelength at present.

The applicant has also put forward a number of lens groups related to infrared wavelength reception, however, at present, the game machine is based on a more three-dimensional, real and immediate 3D game, the current or the applicant's previous lens groups are all 2D plane games, which cannot meet the 3D game focusing on the deep induction efficacy.

Special infrared receiving and induction lens groups for game machines are made of plastic for the pursuit of low cost, however, poor material transparency is one of the key factors that affect the depth detection accuracy of the game machine, and plastic lenses are easy to overheat or too cold in ambient temperature, so that the focal length of the lens group will be changed and cannot focus accurately. Therefore, the current infrared receiving and induction lens groups cannot meet the 3D game depth precise induction requirement.

The present invention mitigates and/or obviates the aforementioned disadvantages.

SUMMARY

The primary objective of the present invention is to provide a five-piece infrared single wavelength lens system which has a wide field of view, big stop, short length and less distortion.

Therefore, a five-piece infrared single wavelength lens system in accordance with the present invention comprises a stop and a lens group having five lens elements, in order from an object side to an image side:

a first lens element with a negative refractive power having an object-side surface being convex near an optical axis and an image-side surface being concave near the optical axis, at least one of the object-side surface and the image-side surface of the first lens element being aspheric; the stop; a second lens element with a positive refractive power having an object-side surface being convex near the optical axis and an image-side surface being convex near the optical axis, at least one of the object-side surface and the image-side surface of the second lens element being aspheric; a third lens element with a negative refractive power having an object-side surface being convex near the optical axis and an image-side surface being concave near the optical axis, at least one of the object-side surface and the image-side surface of the third lens element being aspheric; a fourth lens element with a positive refractive power having an object-side surface being convex near the optical axis and an image-side surface being convex near the optical axis; and a fifth lens element with a negative refractive power having an object-side surface being concave near the optical axis and an image-side surface being concave near the optical axis, at least one of the object-side surface and the image-side surface of the fifth lens element being aspheric.

Wherein a radius of curvature of the object-side surface of the third lens element is R5, a central thickness of the third lens element along the optical axis is CT3, and they satisfy the relation: $5<R5/CT3<35$, if $R5/CT3$ satisfies the above relation, the relationship between the curvature of the object-side surface and the thickness of the third lens element can be balanced.

Preferably, a distance from the object-side surface of the first lens element to the image-side surface of the fifth lens element along the optical axis is TD, a distance along the optical axis between the first lens element and the second lens element is T12, and they satisfy the relation: $2.5<TD/T12<7$, which is favorable to reduce the total optical length, so as to achieve the objective of miniaturization of the lens elements and maintain good yield of assembly.

Preferably, a radius of curvature of the object-side surface of the first lens element is R1, a focal length of the five-piece infrared single wavelength lens system is f, and they satisfy the relation: $-0.7<R1/f<4.3$, so as to obtain a larger imaging area, enhancing the scope of application.

Preferably, a focal length of the first lens element and the second lens element combined is f12, a central thickness of the first lens element along the optical axis is CT1, and they satisfy the relation: $1.2<f12/CT1<9.2$, so that the lens interior space can be used effectively to achieve the objective of miniaturization of the lens element.

Preferably, the central thickness of the first lens element along the optical axis is CT1, a central thickness of the second lens element along the optical axis is CT2, and they satisfy the relation: $0.25<CT1/CT2<0.95$, which can make the first lens element matched with the second lens element to reduce the aberration.

Preferably, a radius of curvature of the object-side surface of the second lens element is R3, the distance along the optical axis between the first lens element and the second lens element is T12, and they satisfy the relation: $0.6<R3/T12<8.6$, so that the mirror spacing can be shortened to achieve the objective of miniaturization of the lens elements.

Preferably, a radius of curvature of the image-side surface of the third lens element is R6, a focal length of the third lens element is f3, and they satisfy the relation: $-0.55<R6/f3<-0.35$, which is favorable to correct the high order aberrations and astigmatism of the system.

Preferably, a radius of curvature of the object-side surface of the fourth lens element is R7, a focal length of the third lens element and the fourth lens element combined is f34, and they satisfy the relation: $0.3<R7/f34<1.3$, which is favorable to the lens formability.

Preferably, a central thickness of the fourth lens element along the optical axis is CT4, a distance along the optical axis between the fourth lens element and the fifth lens element is T45, and they satisfy the relation: $14<CT4/T45<59$, which can adjust the thickness and spacing of the lens elements, so as to reduce the effect of manufacturing tolerance on image quality.

Preferably, the radius of curvature of the object-side surface of the fourth lens element is R7, a distance along the optical axis between the third lens element and the fourth lens element is T34, and they satisfy the relation: 10<R7/T34<33, which can control the surface shape of the object-side surface of the fourth lens element and the distance between the third lens element and the fourth lens element, which is favorable to obtain a proper balance between the miniaturization and yield of assembly.

Preferably, a radius of curvature of the object-side surface of the fifth lens element is R9, a radius of curvature of the image-side surface of the first lens element is R2, and they satisfy the relation: 6<|R9/R2|<84, which can reduce the spherical aberration and astigmatism of the five-piece infrared single wavelength lens system.

Preferably, a focal length of the fifth lens element is f5, the focal length of the third lens element is f3, and they satisfy the relation: 2.3<f5/f3<11.5, so that the distribution of the refractive power will be appropriate, it will be favorable to correct the aberration of the system and improve the image quality.

Preferably, the focal length of the five-piece infrared single wavelength lens system is f, the focal length of the fifth lens element is f5, and they satisfy the relation: 0.07<f/|f5|<0.4, which ensures that the lens system has sufficient refractive power to shorten the lens length.

Preferably, the radius of curvature of the image-side surface of the first lens element is R2, the central thickness of the first lens element along the optical axis is CT1, and they satisfy the relation: 1<R2/CT1<3.5, so that the curvature of the image-side surface of the first lens element can enhance the wide angle characteristic and provide a larger field of view.

Preferably, a focal length of the second lens element is f2, the focal length of the first lens element and the second lens element combined is f12, and they satisfy the relation: 0.7<f2/f12<1.5, it will be favorable to obtain a wide field of view and correct the image plane curve effectively.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 4B shows the image plane curve and the distortion curve of the fourth embodiment of the present invention;

DETAILED DESCRIPTION

Figure 1A:
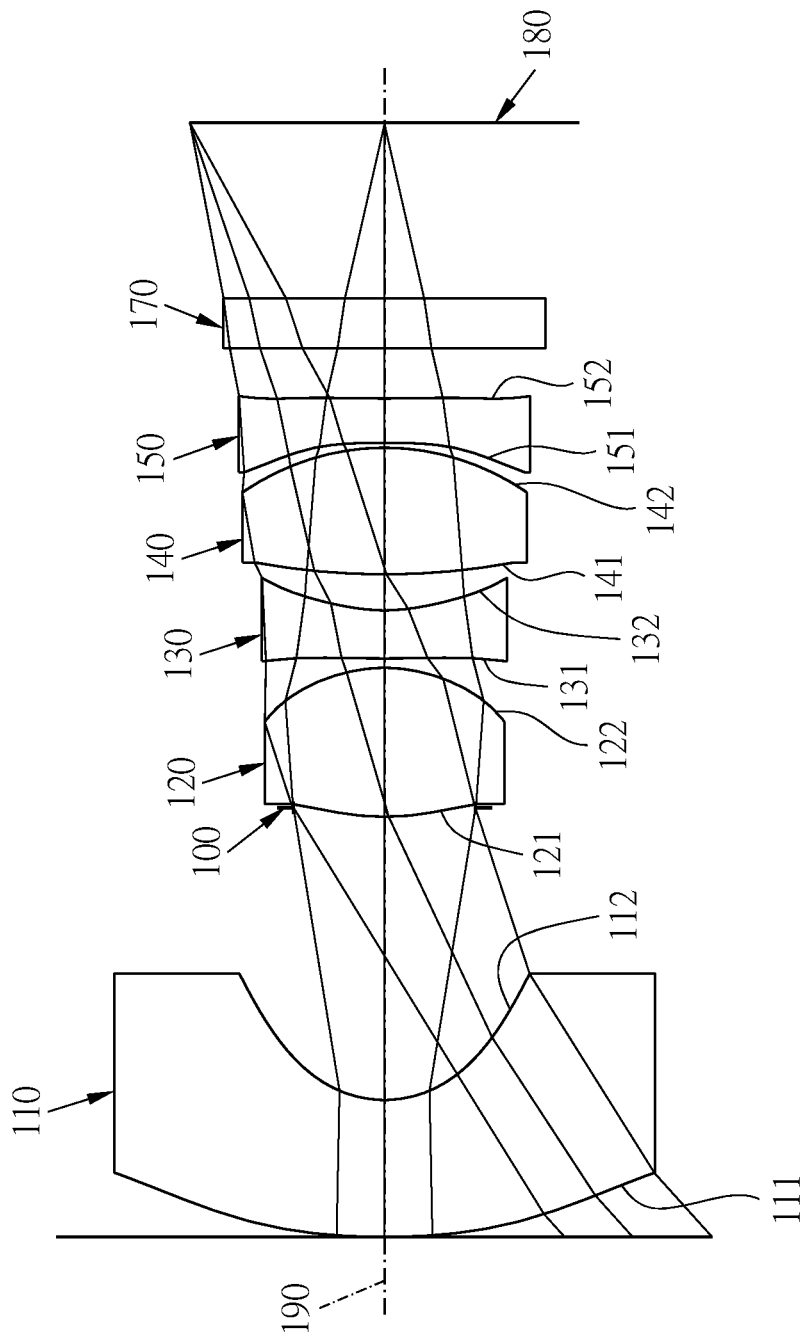
FIG. 1A shows a five-piece infrared single wavelength lens system in accordance with a first embodiment of the present invention.
Figure 1B:
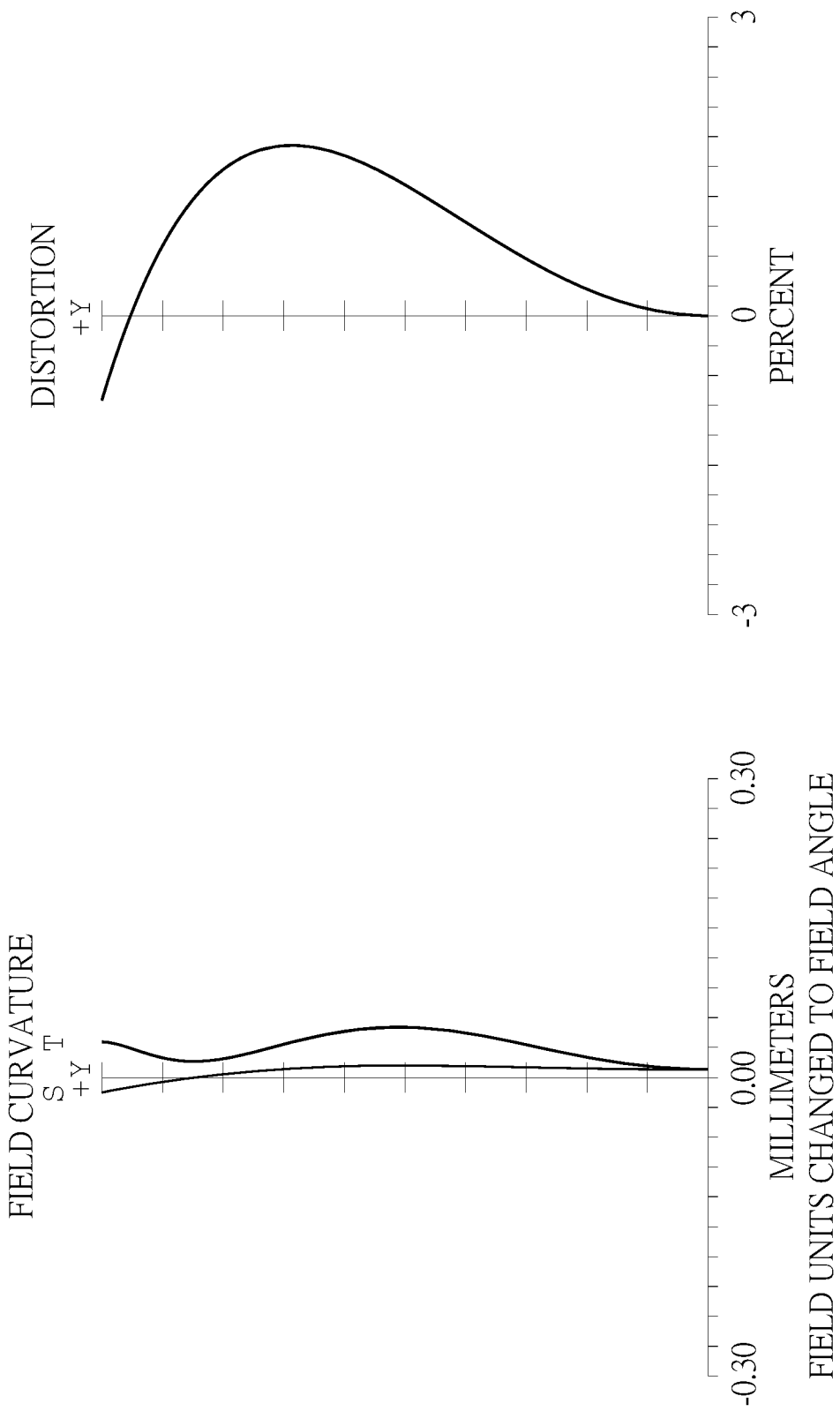
FIG. 1B shows the image plane curve and the distortion curve of the first embodiment of the present invention.

Referring to FIGS. 1A and 1B, FIG. 1A shows a five-piece infrared single wavelength lens system in accordance with a first embodiment of the present invention, and FIG. 1B shows, in order from left to right, the image plane curve and the distortion curve of the first embodiment of the present invention. A five-piece infrared single wavelength lens system in accordance with the first embodiment of the present invention comprises a stop 100 and a lens group. The lens group comprises, in order from an object side to an image side: a first lens element 110, a second lens element 120, a third lens element 130, a fourth lens element 140, a fifth lens element 150, an IR band-pass element 170, and an image plane 180, wherein the five-piece infrared single wavelength lens system has a total of five lens elements with refractive power. The stop 100 is disposed between the first lens element 110 and the second lens element 120.

The first lens element 110 with a negative refractive power has an object-side surface 111 being convex near an optical axis 190 and an image-side surface 112 being concave near the optical axis 190, the object-side surface 111 and the image-side surface 112 are aspheric, and the first lens element 110 is made of plastic material.

The second lens element 120 with a positive refractive power has an object-side surface 121 being convex near the optical axis 190 and an image-side surface 122 being convex near the optical axis 190, the object-side surface 121 and the image-side surface 122 are aspheric, and the second lens element 120 is made of plastic material.

The third lens element 130 with a negative refractive power has an object-side surface 131 being convex near the optical axis 190 and an image-side surface 132 being concave near the optical axis 190, the object-side surface 131 and the image-side surface 132 are aspheric, and the third lens element 130 is made of plastic material.

The fourth lens element 140 with a positive refractive power has an object-side surface 141 being convex near the optical axis 190 and an image-side surface 142 being convex near the optical axis 190, and the fourth lens element 140 is made of plastic material.

The fifth lens element 150 with a negative refractive power has an object-side surface 151 being concave near the optical axis 190 and an image-side surface 152 being concave near the optical axis 190, the object-side surface 151 and the image-side surface 152 are aspheric, and the fifth lens element 150 is made of plastic material.

The IR band-pass element 170 made of glass is located between the fifth lens element 150 and the image plane 180 and has no influence on the focal length of the five-piece infrared single wavelength lens system.

The equation for the aspheric surface profiles of the respective lens elements of the first embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Fh^{14} + Gh^{16} \ldots$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, F, G, . . . : represent the high-order aspheric coefficients.

In the first embodiment of the present five-piece infrared single wavelength lens system, a focal length of the five-piece infrared single wavelength lens system is f, a f-number of the five-piece infrared single wavelength lens system is Fno, the five-piece infrared single wavelength lens system has a maximum view angle (field of view) FOV, and they satisfy the relations: f=3.03 mm; Fno=2.0; and FOV=89.88 degrees.

In the first embodiment of the present five-piece infrared single wavelength lens system, a radius of curvature of the object-side surface 131 of the third lens element 130 is R5, a central thickness of the third lens element 130 along the optical axis 190 is CT3, and they satisfy the relation: R5/CT3=34.57.

In the first embodiment of the present five-piece infrared single wavelength lens system, a distance from the object-side surface 111 of the first lens element 110 to the image-side surface 152 of the fifth lens element 150 along the optical axis 190 is TD, a distance along the optical axis 190 between the first lens element 10 and the second lens element 120 is T12, and they satisfy the relation: TD/T12=2.96.

In the first embodiment of the present five-piece infrared single wavelength lens system, a radius of curvature of the object-side surface 111 of the first lens element 110 is R1, the focal length of the five-piece infrared single wavelength lens system is f, and they satisfy the relation: R1/f=4.16.

In the first embodiment of the present five-piece infrared single wavelength lens system, a focal length of the first lens element 110 and the second lens element 120 combined is f12, a central thickness of the first lens element 110 along the optical axis 190 is CT1, and they satisfy the relation: f12/CT1=1.40.

In the first embodiment of the present five-piece infrared single wavelength lens system, the central thickness of the first lens element 110 along the optical axis 190 is CT1, a central thickness of the second lens element 120 along the optical axis 190 is CT2, and they satisfy the relation: CT1/CT2=0.92.

In the first embodiment of the present five-piece infrared single wavelength lens system, a radius of curvature of the object-side surface 121 of the second lens element 120 is R3, the distance along the optical axis 190 between the first lens element 110 and the second lens element 120 is T12, and they satisfy the relation: R3/T12=1.16.

In the first embodiment of the present five-piece infrared single wavelength lens system, a radius of curvature of the image-side surface 132 of the third lens element 130 is R6, a focal length of the third lens element 130 is f3, and they satisfy the relation: R6/f3=−0.53.

In the first embodiment of the present five-piece infrared single wavelength lens system, a radius of curvature of the object-side surface 141 of the fourth lens element 140 is R7, a focal length of the third lens element 130 and the fourth lens element 140 combined is f34, and they satisfy the relation: R7/f34=1.11.

In the first embodiment of the present five-piece infrared single wavelength lens system, a central thickness of the fourth lens element 140 along the optical axis 190 is CT4, a distance along the optical axis 190 between the fourth lens element 140 and the fifth lens element 150 is T45, and they satisfy the relation: CT4/T45=25.45.

In the first embodiment of the present five-piece infrared single wavelength lens system, the radius of curvature of the object-side surface 141 of the fourth lens element 140 is R7, a distance along the optical axis 190 between the third lens element 130 and the fourth lens element 140 is T34, and they satisfy the relation: R7/T34=23.99.

In the first embodiment of the present five-piece infrared single wavelength lens system, a radius of curvature of the object-side surface 151 of the fifth lens element 150 is R9, a radius of curvature of the image-side surface 112 of the first lens element 110 is R2, and they satisfy the relation: R9/R2=9.08.

In the first embodiment of the present five-piece infrared single wavelength lens system, a focal length of the fifth lens element 150 is f5, the focal length of the third lens element 130 is f3, and they satisfy the relation: f5/f3=2.51.

In the first embodiment of the present five-piece infrared single wavelength lens system, the focal length of the five-piece infrared single wavelength lens system is f, the focal length of the fifth lens element 150 is f5, and they satisfy the relation: f/|f5|=0.22.

In the first embodiment of the present five-piece infrared single wavelength lens system, the radius of curvature of the image-side surface 112 of the first lens element 110 is R2, the central thickness of the first lens element 110 along the optical axis 190 is CT1, and they satisfy the relation: R2/CT1=1.01.

In the first embodiment of the present five-piece infrared single wavelength lens system, a focal length of the second lens element 120 is f2, the focal length of the first lens element 110 and the second lens element 120 combined is f12, and they satisfy the relation: f2/f12=1.65.

The detailed optical data of the first embodiment is shown in table 1, and the aspheric surface data is shown in table 2.

TABLE 1

Embodiment 1
f(focal length) = 3.03 mm, Fno = 2.0, FOV = 89.88 deg.

| surface | | Curvature Radius | Thickness | Material | Index | Abbe # | Focal length |
|---|---|---|---|---|---|---|---|
| 0 | object | infinity | 2000 | | | | |
| 1 | Lens 1 | 12.636 (ASP) | 1.905 | plastic | 1.53 | 55.6 | −4.61 |
| 2 | | 1.933 (ASP) | 4.067 | | | | |
| 3 | stop | infinity | −0.124 | | | | |
| 4 | Lens 2 | 4.562 (ASP) | 2.070 | plastic | 1.53 | 55.6 | 3.41 |
| 5 | | −2.504 (ASP) | 0.132 | | | | |

TABLE 1-continued

Embodiment 1
f(focal length) = 3.03 mm, Fno = 2.0, FOV = 89.88 deg.

| surface | | Curvature Radius | Thickness | Material | Index | Abbe # | Focal length |
|---|---|---|---|---|---|---|---|
| 6 | Lens 3 | 23.115 (ASP) | 0.669 | plastic | 1.64 | 22.5 | −5.62 |
| 7 | | 3.000 (ASP) | 0.500 | | | | |
| 8 | Lens 4 | 11.990 | 1.764 | glass | 1.73 | 54.7 | 4.50 |
| 9 | | −4.153 | 0.069 | | | | |
| 10 | Lens 5 | −17.552 (ASP) | 0.614 | plastic | 1.64 | 22.5 | −14.06 |
| 11 | | 17.696 (ASP) | 0.700 | | | | |
| 12 | IR band-pass element | infinity | 0.700 | glass | 1.52 | 64.2 | |
| 13 | | infinity | 2.440 | | | | |
| 14 | Image plane | infinity | infinity | | | | |

TABLE 2

Aspheric Coefficients

| surface | 1 | 2 | 4 | 5 | 6 |
|---|---|---|---|---|---|
| K: | 2.7104E+00 | 2.6145E−01 | 2.4609E+00 | −2.7430E−01 | 9.5151E+01 |
| A: | 3.8389E−03 | −4.0575E−02 | −4.8620E−03 | 3.6062E−02 | −1.0230E−02 |
| B: | −4.6257E−04 | 3.5028E−01 | −1.4106E−02 | −2.4537E−02 | −3.8757E−03 |
| C: | 3.4013E−05 | −1.1237E+00 | 1.5167E−02 | 1.0070E−02 | 3.7599E−03 |
| D: | −1.9104E−06 | 1.3840E+00 | −1.1249E−02 | −2.8050E−03 | −1.9180E−03 |
| E: | 6.5708E−08 | −1.0441E+00 | 4.0195E−03 | 3.4475E−04 | 5.8016E−04 |
| F: | −1.1351E−09 | 4.1759E−01 | −5.9561E−04 | 1.1437E−05 | −9.1556E−05 |
| G: | 5.6384E−12 | −5.6927E−02 | −1.3421E−06 | −5.7186E−06 | 5.2247E−06 |

| surface | 7 | 8 | 9 | 10 | 11 |
|---|---|---|---|---|---|
| K: | −4.4062E+00 | 0.0000E+00 | 0.0000E+00 | 5.5550E+01 | 2.6471E+01 |
| A: | −3.2282E−02 | 0.0000E+00 | 0.0000E+00 | −3.2934E−02 | −2.3550E−02 |
| B: | 1.9400E−02 | 0.0000E+00 | 0.0000E+00 | 5.0953E−03 | 5.3714E−03 |
| C: | −5.8483E−03 | 0.0000E+00 | 0.0000E+00 | −1.3160E−04 | −3.3150E−04 |
| D: | 7.9259E−04 | 0.0000E+00 | 0.0000E+00 | 6.4294E−05 | −4.1645E−05 |
| E: | 2.1559E−04 | 0.0000E+00 | 0.0000E+00 | −1.4588E−06 | 2.4127E−05 |
| F: | −8.8885E−05 | 0.0000E+00 | 0.0000E+00 | −3.3103E−06 | −4.4268E−06 |
| G: | 8.0457E−06 | 0.0000E+00 | 0.0000E+00 | 3.2974E−07 | 2.4438E−07 |

The units of the radius of curvature, the thickness and the focal length in table 1 are expressed in mm, the surface numbers 0-14 represent the surfaces sequentially arranged from the object-side to the image-side along the optical axis. In table 2, k represents the conic coefficient of the equation of the aspheric surface profiles, and A, B, C, D, E, F, G . . . : represent the high-order aspheric coefficients. The tables presented below for each embodiment are the corresponding schematic parameter, image plane curves and distortion curves, and the definitions of the tables are the same as Table 1 and Table 2 of the first embodiment. Therefore, an explanation in this regard will not be provided again.

Figure 2A:
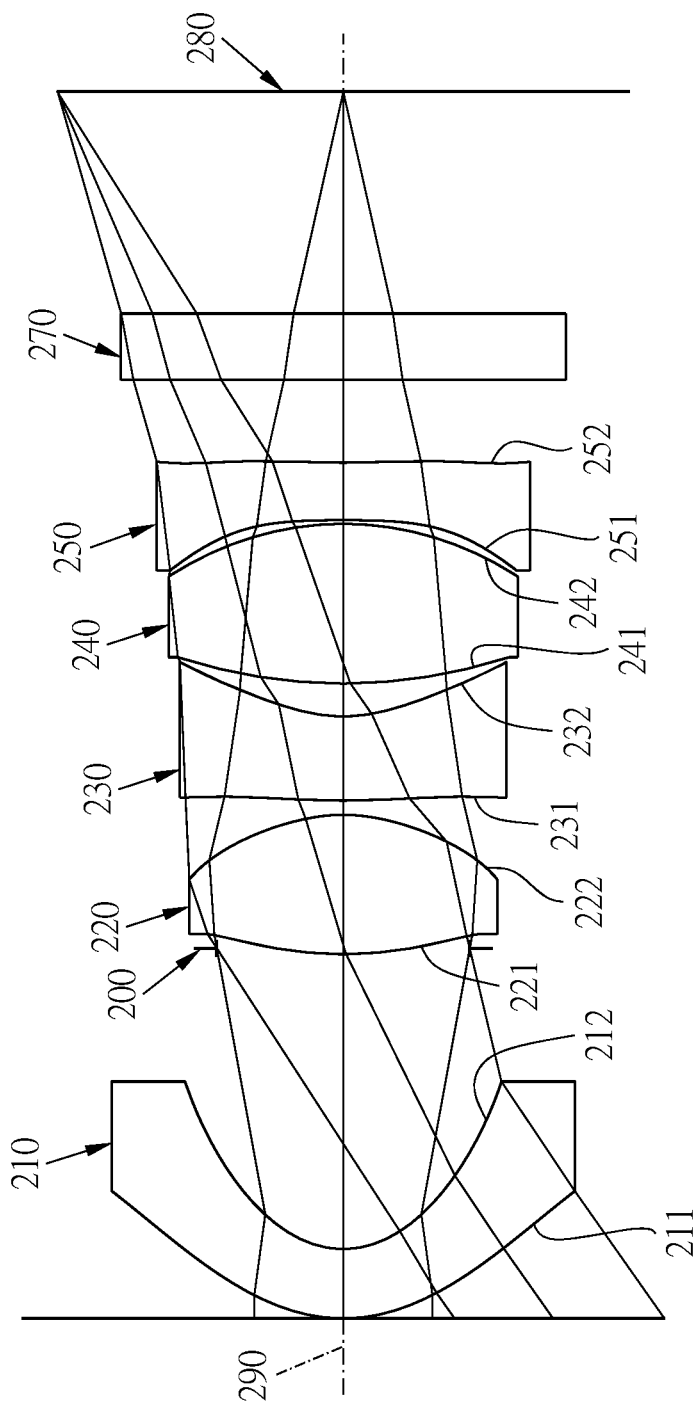
FIG. 2A shows a five-piece infrared single wavelength lens system in accordance with a second embodiment of the present invention.
Figure 2B:
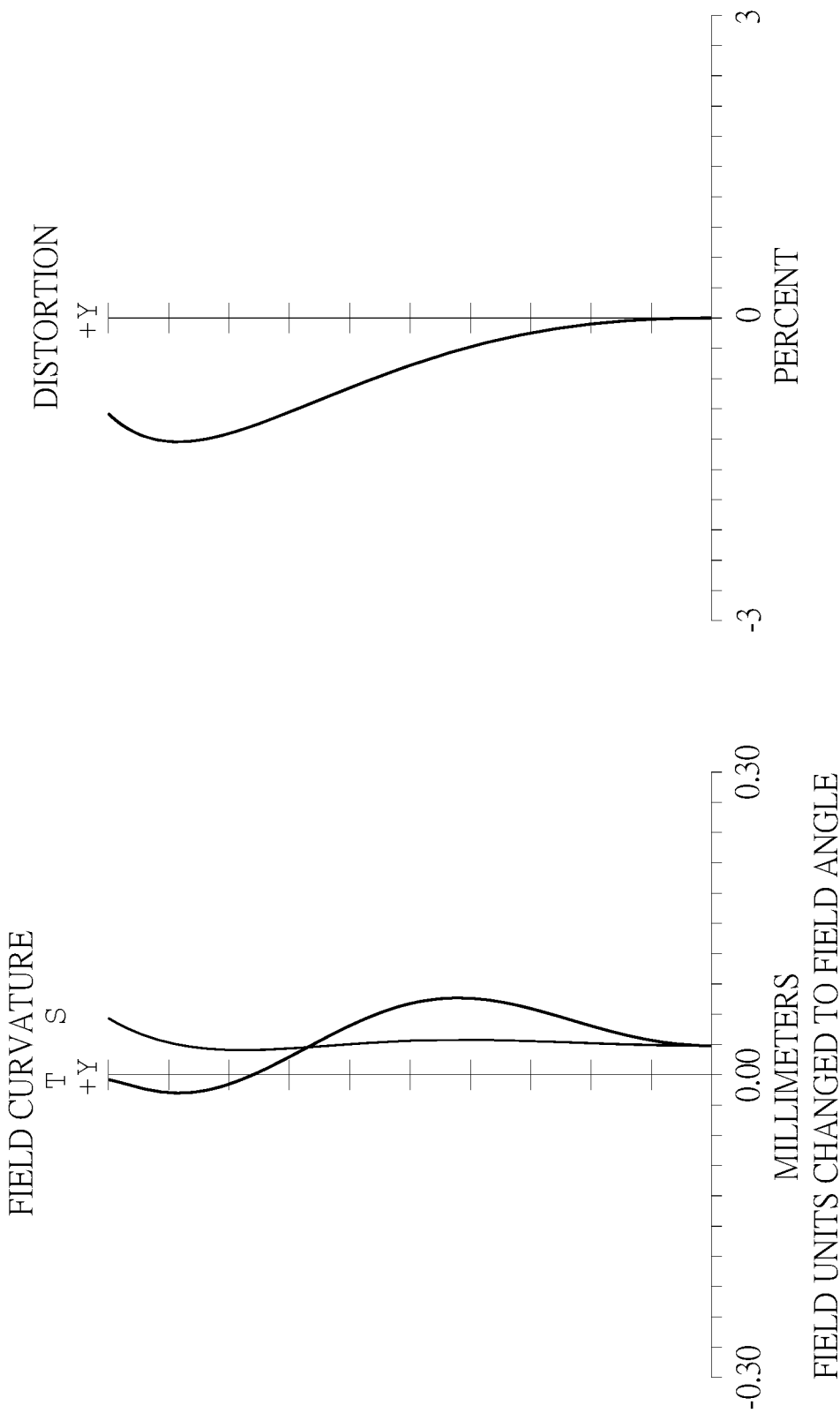
FIG. 2B shows the image plane curve and the distortion curve of the second embodiment of the present invention.

Referring to FIGS. 2A and 2B, FIG. 2A shows a five-piece infrared single wavelength lens system in accordance with a second embodiment of the present invention, and FIG. 2B shows, in order from left to right, the image plane curve and the distortion curve of the second embodiment of the present invention. A five-piece infrared single wavelength lens system in accordance with the second embodiment of the present invention comprises a stop 200 and a lens group. The lens group comprises, in order from an object side to an image side: a first lens element 210, a second lens element 220, a third lens element 230, a fourth lens element 240, a fifth lens element 250, an IR band-pass element 270, and an image plane 280, wherein the five-piece infrared single wavelength lens system has a total of five lens elements with refractive power. The stop 200 is disposed between the first lens element 210 and the second lens element 220.

The first lens element 210 with a negative refractive power has an object-side surface 211 being convex near an optical axis 290 and an image-side surface 212 being concave near the optical axis 290, the object-side surface 211 and the image-side surface 212 are aspheric, and the first lens element 210 is made of plastic material.

The second lens element 220 with a positive refractive power has an object-side surface 221 being convex near the optical axis 290 and an image-side surface 222 being convex near the optical axis 290, the object-side surface 221 and the image-side surface 222 are aspheric, and the second lens element 220 is made of plastic material.

The third lens element 230 with a negative refractive power has an object-side surface 231 being convex near the optical axis 290 and an image-side surface 232 being concave near the optical axis 290, the object-side surface 231 and the image-side surface 232 are aspheric, and the third lens element 230 is made of plastic material.

The fourth lens element 240 with a positive refractive power has an object-side surface 241 being convex near the optical axis 290 and an image-side surface 242 being convex near the optical axis 290, and the fourth lens element 240 is made of plastic material.

The fifth lens element 250 with a negative refractive power has an object-side surface 251 being concave near the optical axis 290 and an image-side surface 252 being concave near the optical axis 290, the object-side surface 251 and the image-side surface 252 are aspheric, and the fifth lens element 250 is made of plastic material.

The IR band-pass element 270 made of glass is located between the fifth lens element 250 and the image plane 280 and has no influence on the focal length of the five-piece infrared single wavelength lens system.

The detailed optical data of the second embodiment is shown in table 3, and the aspheric surface data is shown in table 4.

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | | | |
|---|---|---|---|
| f[mm] | 4.35 | R6/f3 | −0.50 |
| Fno | 2.1 | R7/f34 | 0.43 |
| FOV[deg.] | 76.71 | CT4/T45 | 42.64 |
| R5/CT3 | 13.15 | R7/T34 | 20.17 |
| TD/T12 | 2.90 | |R9/R2| | 16.16 |

TABLE 3

Embodiment 2
f(focal length) = 4.35 mm, Fno = 2.1, FOV = 76.71 deg.

| surface | | Curvature Radius | Thickness | Material | Index | Abbe # | Focal length |
|---|---|---|---|---|---|---|---|
| 0 | object | infinity | 2000 | | | | |
| 1 | Lens 1 | 2.213 (ASP) | 0.735 | plastic | 1.53 | 55.6 | −6.93 |
| 2 | | 1.220 (ASP) | 3.176 | | | | |
| 3 | stop | infinity | −0.062 | | | | |
| 4 | Lens 2 | 5.198 (ASP) | 1.472 | plastic | 1.53 | 55.6 | 3.25 |
| 5 | | −2.312 (ASP) | 0.151 | | | | |
| 6 | Lens 3 | 11.671 (ASP) | 0.887 | plastic | 1.64 | 22.5 | −3.93 |
| 7 | | 1.965 (ASP) | 0.350 | | | | |
| 8 | Lens 4 | 7.050 | 1.687 | glass | 1.73 | 54.7 | 3.88 |
| 9 | | −4.152 | 0.040 | | | | |
| 10 | Lens 5 | −19.718 (ASP) | 0.610 | plastic | 1.64 | 22.5 | −13.33 |
| 11 | | 14.493 (ASP) | 0.873 | | | | |
| 12 | IR band-pass element | infinity | 0.700 | glass | 1.52 | 64.2 | |
| 13 | | infinity | 2.350 | | | | |
| 14 | Image plane | infinity | infinity | | | | |

TABLE 4

Aspheric Coefficients

| surface | 1 | 2 | 4 | 5 | 6 |
|---|---|---|---|---|---|
| K: | −5.5824E−01 | −7.8883E−01 | 5.0117E+00 | −6.8544E−01 | 3.2919E+01 |
| A: | −9.2834E−03 | 7.5723E−04 | 1.1268E−03 | 4.4654E−02 | −1.2536E−02 |
| B: | −9.0986E−04 | 4.3990E−05 | −1.5610E−02 | −2.4191E−02 | −3.3253E−03 |
| C: | 6.4154E−05 | −5.9174E−04 | 1.6454E−02 | 9.6840E−03 | 3.5342E−03 |
| D: | −3.9624E−06 | 4.5262E−04 | −1.1033E−02 | −2.8098E−03 | −1.9882E−03 |
| E: | −1.0785E−07 | −6.2510E−05 | 3.8599E−03 | 3.6090E−04 | 5.8915E−04 |
| F: | 2.0235E−08 | −5.3664E−06 | −6.6538E−04 | 1.6336E−05 | −8.8271E−05 |
| G: | −3.1521E−09 | 2.4525E−06 | 3.7018E−05 | −8.3100E−06 | 4.7717E−06 |

| surface | 7 | 8 | 9 | 10 | 11 |
|---|---|---|---|---|---|
| K: | −3.7430E+00 | 0.0000E+00 | 0.0000E+00 | 4.4191E+01 | 7.9456E+00 |
| A: | −3.0277E−02 | 0.0000E+00 | 0.0000E+00 | −3.7034E−02 | −2.4001E−02 |
| B: | 1.8064E−02 | 0.0000E+00 | 0.0000E+00 | 3.5902E−03 | 4.3152E−03 |
| C: | −6.1945E−03 | 0.0000E+00 | 0.0000E+00 | −3.6190E−04 | −1.7107E−04 |
| D: | 7.8379E−04 | 0.0000E+00 | 0.0000E+00 | 1.1134E−04 | −3.8276E−05 |
| E: | 2.1886E−04 | 0.0000E+00 | 0.0000E+00 | 2.8361E−06 | 2.2343E−05 |
| F: | −8.4886E−05 | 0.0000E+00 | 0.0000E+00 | −3.5154E−06 | −4.2263E−06 |
| G: | 8.0818E−06 | 0.0000E+00 | 0.0000E+00 | 2.0937E−07 | 2.5103E−07 |

-continued

| Embodiment 2 | | | |
|---|---|---|---|
| R1/f | 0.51 | f5/f3 | 3.39 |
| f12/CT1 | 4.57 | f/|f5| | 0.33 |
| CT1/CT2 | 0.50 | R2/CT1 | 1.66 |
| R3/T12 | 1.67 | f2/CT2 | 2.21 |

Figure 3A:
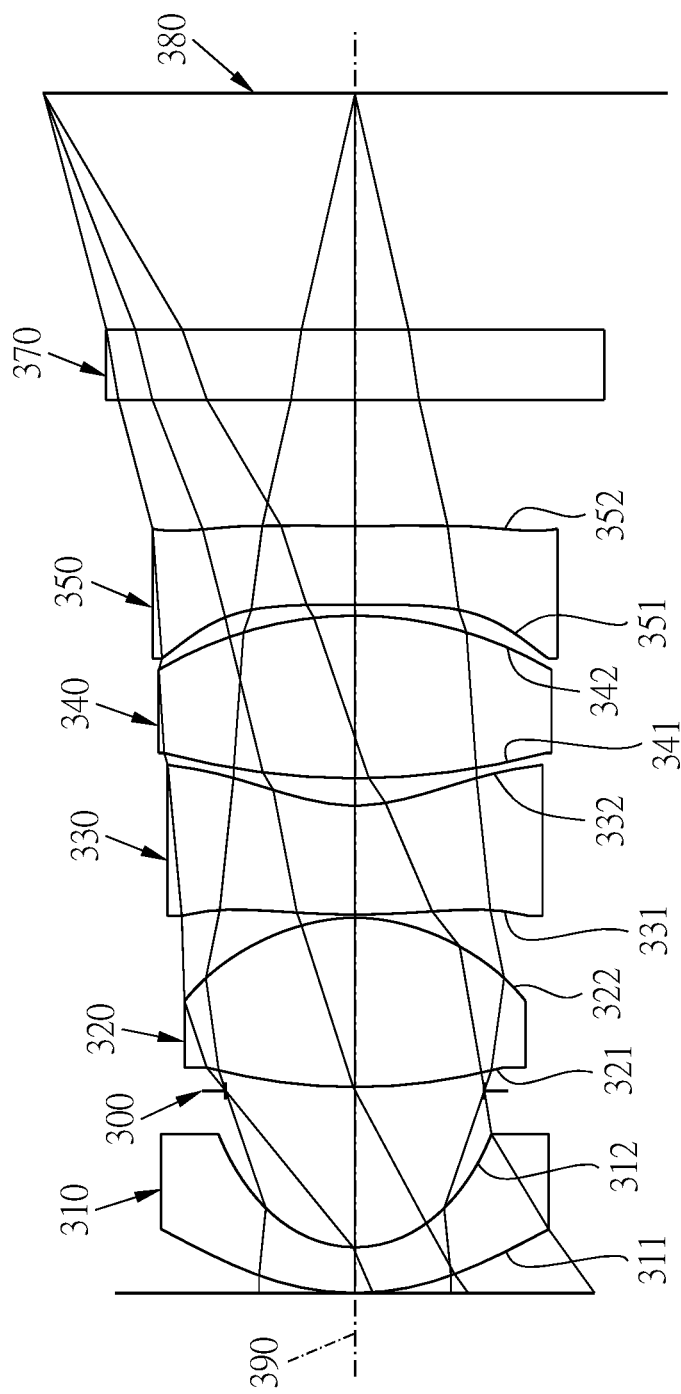
FIG. 3A shows a five-piece infrared single wavelength lens system in accordance with a third embodiment of the present invention.
Figure 3B:
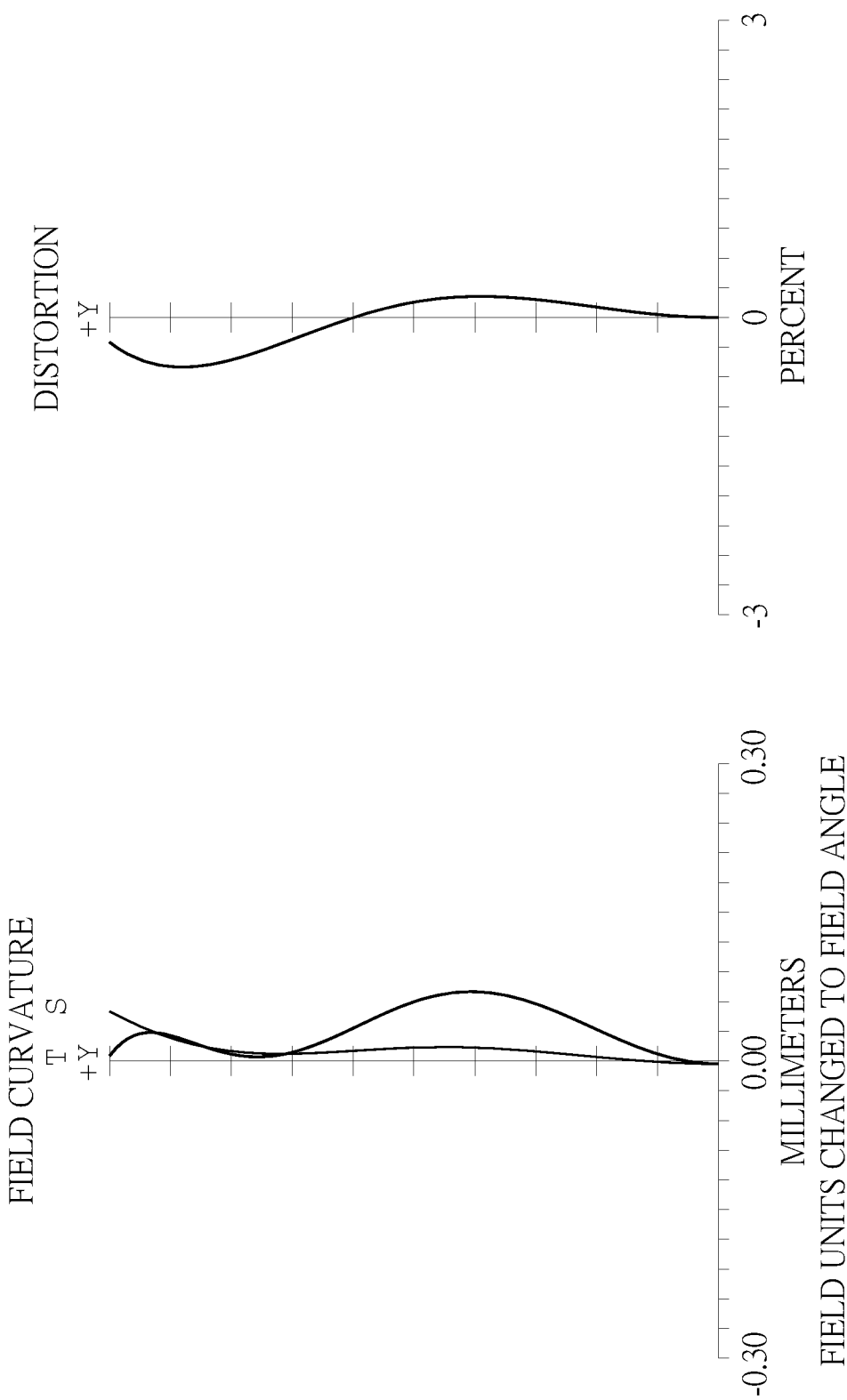
FIG. 3B shows the image plane curve and the distortion curve of the third embodiment of the present invention.

Referring to FIGS. 3A and 31B, FIG. 3A shows a five-piece infrared single wavelength lens system in accordance with a third embodiment of the present invention, and FIG. 3B shows, in order from left to right, the image plane curve and the distortion curve of the third embodiment of the present invention. A five-piece infrared single wavelength lens system in accordance with the third embodiment of the present invention comprises a stop 300 and a lens group. The lens group comprises, in order from an object side to an image side: a first lens element 310, a second lens element 320, a third lens element 330, a fourth lens element 340, a fifth lens element 350, an IR band-pass element 370, and an image plane 380, wherein the five-piece infrared single wavelength lens system has a total of five lens elements with refractive power. The stop 300 is disposed between the first lens element 310 and the second lens element 320.

The first lens element 310 with a negative refractive power has an object-side surface 311 being convex near an optical axis 390 and an image-side surface 312 being concave near the optical axis 390, the object-side surface 311 and the image-side surface 312 are aspheric, and the first lens element 310 is made of plastic material.

The second lens element 320 with a positive refractive power has an object-side surface 321 being convex near the optical axis 390 and an image-side surface 322 being convex near the optical axis 390, the object-side surface 321 and the image-side surface 322 are aspheric, and the second lens element 320 is made of plastic material.

The third lens element 330 with a negative refractive power has an object-side surface 331 being convex near the optical axis 390 and an image-side surface 332 being concave near the optical axis 390, the object-side surface 331 and the image-side surface 332 are aspheric, and the third lens element 330 is made of plastic material.

The fourth lens element 340 with a positive refractive power has an object-side surface 341 being convex near the optical axis 390 and an image-side surface 342 being convex near the optical axis 390, and the fourth lens element 340 is made of plastic material.

The fifth lens element 350 with a negative refractive power has an object-side surface 351 being concave near the optical axis 390 and an image-side surface 352 being concave near the optical axis 390, the object-side surface 351 and the image-side surface 352 are aspheric, and the fifth lens element 350 is made of plastic material.

The IR band-pass element 370 made of glass is located between the fifth lens element 350 and the image plane 380 and has no influence on the focal length of the five-piece infrared single wavelength lens system.

The detailed optical data of the third embodiment is shown in table 5, and the aspheric surface data is shown in table 6.

TABLE 5

Embodiment 3
f(focal length) = 4.30 mm, Fno = 2.1, FOV = 76.71 deg.

| surface | | Curvature Radius | Thickness | Material | Index | Abbe # | Focal length |
|---|---|---|---|---|---|---|---|
| 0 | object | infinity | 2000 | | | | |
| 1 | Lens 1 | 3.207 (ASP) | 0.455 | plastic | 1.53 | 55.6 | −4.98 |
| 2 | | 1.374 (ASP) | 1.554 | | | | |
| 3 | stop | infinity | 0.036 | | | | |
| 4 | Lens 2 | 7.467 (ASP) | 1.683 | plastic | 1.53 | 55.6 | 3.27 |
| 5 | | −2.072 (ASP) | 0.029 | | | | |
| 6 | Lens 3 | 8.748 (ASP) | 1.081 | plastic | 1.64 | 22.5 | −4.46 |
| 7 | | 2.010 (ASP) | 0.273 | | | | |
| 8 | Lens 4 | 8.786 | 1.615 | glass | 1.73 | 54.7 | 4.37 |
| 9 | | −4.518 | 0.110 | | | | |
| 10 | Lens 5 | −114.808 (ASP) | 0.781 | plastic | 1.64 | 22.5 | −50.92 |
| 11 | | 43.978 (ASP) | 1.251 | | | | |
| 12 | IR band-pass element | infinity | 0.700 | glass | | 1.52 | 64.2 |
| 13 | | infinity | 2.350 | | | | |
| 14 | Image plane | infinity | infinity | | | | |

TABLE 6

Aspheric Coefficients

| surface | 1 | 2 | 4 | 5 | 6 |
|---|---|---|---|---|---|
| K: | 4.7733E−01 | −4.4302E−01 | 1.0497E+01 | −5.7719E−01 | 1.5179E+01 |
| A: | −1.4453E−03 | 1.4125E−02 | 9.4637E−03 | 4.2927E−02 | −1.8467E−02 |
| B: | −2.5932E−03 | 8.6994E−03 | −1.4951E−02 | −2.4226E−02 | −2.1777E−03 |
| C: | −1.4082E−04 | −9.4380E−03 | 1.5707E−02 | 9.4502E−03 | 2.6153E−03 |
| D: | 6.4989E−05 | 2.9290E−03 | −1.0482E−02 | −2.6687E−03 | −1.7587E−03 |
| E: | 7.9280E−06 | 1.7388E−03 | 3.7524E−03 | 3.4672E−04 | 5.3034E−04 |

TABLE 6-continued

| Aspheric Coefficients | | | | | |
|---|---|---|---|---|---|
| F: | −4.3786E−06 | −1.3928E−03 | −6.8295E−04 | 1.1906E−05 | −8.1041E−05 |
| G: | 3.3485E−07 | 2.9323E−04 | 4.8273E−05 | −5.5666E−06 | 5.4968E−06 |

| surface | 7 | 8 | 9 | 10 | 11 |
|---|---|---|---|---|---|
| K: | −4.4400E+00 | 0.0000E+00 | 0.0000E+00 | −5.0271E+02 | 2.4151E+02 |
| A: | −3.5807E−02 | 0.0000E+00 | 0.0000E+00 | −2.6327E−02 | −8.9119E−03 |
| B: | 1.6064E−02 | 0.0000E+00 | 0.0000E+00 | −1.0701E−03 | −1.3679E−03 |
| C: | −5.5898E−03 | 0.0000E+00 | 0.0000E+00 | −5.0863E−04 | 5.9375E−04 |
| D: | 6.2929E−04 | 0.0000E+00 | 0.0000E+00 | 1.1279E−04 | −4.7910E−05 |
| E: | 1.9750E−04 | 0.0000E+00 | 0.0000E+00 | 1.5002E−05 | 1.6501E−05 |
| F: | −7.0713E−05 | 0.0000E+00 | 0.0000E+00 | 2.4131E−06 | −3.7389E−06 |
| G: | 6.6981E−06 | 0.0000E+00 | 0.0000E+00 | −6.3361E−07 | 3.0013E−07 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f[mm] | 4.30 | R6/f3 | −0.45 |
| Fno | 2.1 | R7/f34 | 0.36 |
| FOV[deg.] | 76.71 | CT4/T45 | 14.67 |
| R5/CT3 | 8.09 | R7/T34 | 32.17 |
| TD/T12 | 4.79 | |R9/R2| | 83.54 |
| R1/f | −0.64 | f5/f3 | 11.41 |
| f12/CT1 | 9.02 | f/|f5| | 0.08 |
| CT1/CT2 | 0.27 | R2/CT1 | 3.02 |
| R3/T12 | 4.70 | f2/CT2 | 1.94 |

Figure 4A:
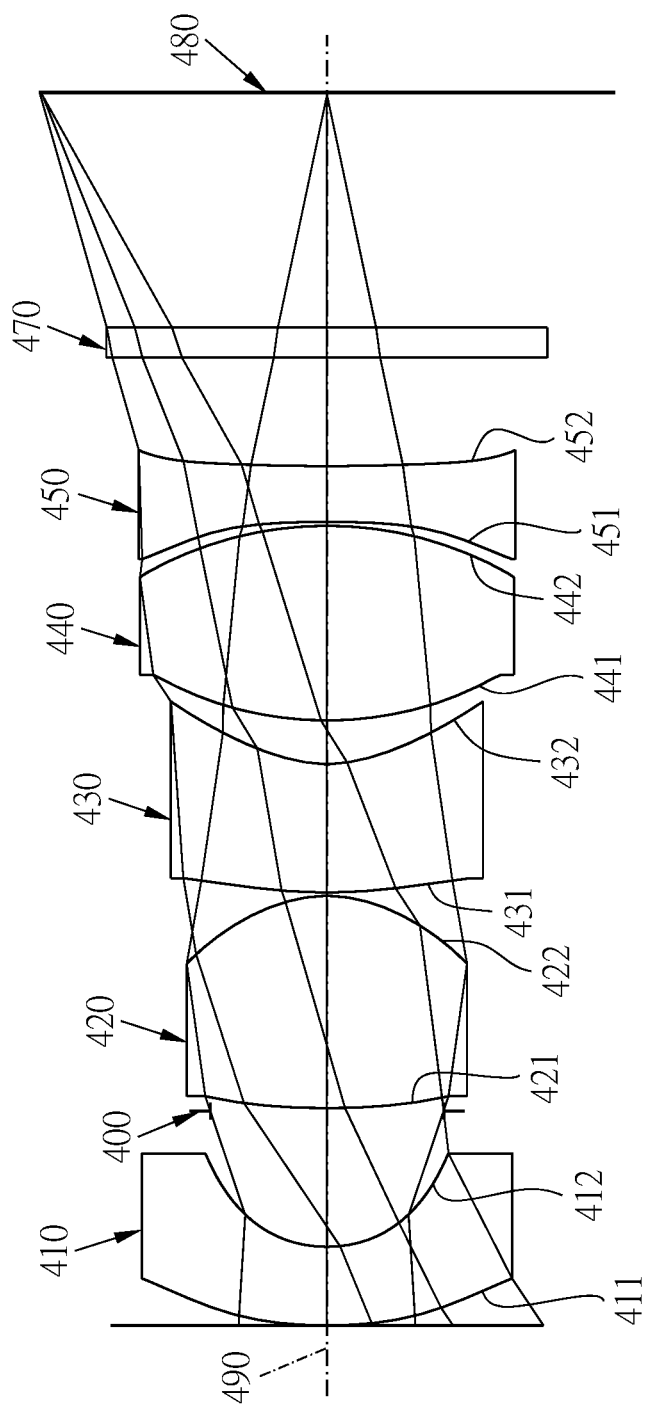
FIG. 4A shows a five-piece infrared single wavelength lens system in accordance with a fourth embodiment of the present invention.

Referring to FIGS. 4A and 4B, FIG. 4A shows a five-piece infrared single wavelength lens system in accordance with a fourth embodiment of the present invention, and FIG. 4B shows, in order from left to right, the image plane curve and the distortion curve of the fourth embodiment of the present invention. A five-piece infrared single wavelength lens system in accordance with the fourth embodiment of the present invention comprises a stop 400 and a lens group. The lens group comprises, in order from an object side to an image side: a first lens element 410, a second lens element 420, a third lens element 430, a fourth lens element 440, a fifth lens element 450, an IR band-pass element 470, and an image plane 480, wherein the five-piece infrared single wavelength lens system has a total of five lens elements with refractive power. The stop 400 is disposed between the first lens element 410 and the second lens element 420.

The first lens element 410 with a negative refractive power has an object-side surface 411 being convex near an optical axis 490 and an image-side surface 412 being concave near the optical axis 490, the object-side surface 411 and the image-side surface 412 are aspheric, and the first lens element 410 is made of plastic material.

The second lens element 420 with a positive refractive power has an object-side surface 421 being convex near the optical axis 490 and an image-side surface 422 being convex near the optical axis 490, the object-side surface 421 and the image-side surface 422 are aspheric, and the second lens element 420 is made of plastic material.

The third lens element 430 with a negative refractive power has an object-side surface 431 being convex near the optical axis 490 and an image-side surface 432 being concave near the optical axis 490, the object-side surface 431 and the image-side surface 432 are aspheric, and the third lens element 430 is made of plastic material.

The fourth lens element 440 with a positive refractive power has an object-side surface 441 being convex near the optical axis 490 and an image-side surface 442 being convex near the optical axis 490, the object-side surface 441 and the image-side surface 442 are aspheric, and the fourth lens element 440 is made of plastic material.

The fifth lens element 450 with a negative refractive power has an object-side surface 451 being concave near the optical axis 490 and an image-side surface 452 being concave near the optical axis 490, the object-side surface 451 and the image-side surface 452 are aspheric, and the fifth lens element 450 is made of plastic material.

The IR band-pass element 470 made of glass is located between the fifth lens element 450 and the image plane 480 and has no influence on the focal length of the five-piece infrared single wavelength lens system.

The detailed optical data of the fourth embodiment is shown in table 7, and the aspheric surface data is shown in table 8.

TABLE 7

Embodiment 4
f(focal length) = 4.29 mm, Fno = 2.1, FOV = 77.07 deg.

| surface | | Curvature Radius | Thickness | Material | Index | Abbe # | Focal length |
|---|---|---|---|---|---|---|---|
| 0 | object | infinity | 2000 | | | | |
| 1 | Lens 1 | 6.834 (ASP) | 0.785 | plastic | 1.54 | 56.0 | −4.86 |
| 2 | | 1.813 (ASP) | 1.359 | | | | |
| 3 | stop | infinity | 0.025 | | | | |
| 4 | Lens 2 | 11.138 (ASP) | 2.122 | plastic | 1.54 | 56.0 | 3.23 |
| 5 | | −1.914 (ASP) | 0.033 | | | | |

TABLE 7-continued

Embodiment 4
f(focal length) = 4.29 mm, Fno = 2.1, FOV = 77.07 deg.

| surface | | Curvature Radius | Thickness | Material | Index | Abbe # | Focal length |
|---|---|---|---|---|---|---|---|
| 6 | Lens 3 | 7.288 (ASP) | 1.285 | plastic | 1.64 | 22.5 | −4.41 |
| 7 | | 1.862 (ASP) | 0.436 | | | | |
| 8 | Lens 4 | 4.796 (ASP) | 1.944 | glass | 1.69 | 53.2 | 4.00 |
| 9 | | −5.307 (ASP) | 0.040 | | | | |
| 10 | Lens 5 | −16.725 (ASP) | 0.558 | plastic | 1.64 | 22.5 | −17.01 |
| 11 | | 29.332 (ASP) | 1.085 | | | | |
| 12 | IR band-pass element | infinity | 0.300 | glass | 1.52 | 64.2 | |
| 13 | | infinity | 2.350 | | | | |
| 14 | Image plane | infinity | infinity | | | | |

TABLE 8

Aspheric Coefficients

| surface | 1 | 2 | 4 | 5 | 6 |
|---|---|---|---|---|---|
| K: | 3.8004E+00 | −7.5235E−02 | 2.0173E+01 | −7.0524E−01 | 4.3796E+00 |
| A: | 1.7605E−02 | 4.4391E−02 | 8.9612E−03 | 3.7150E−02 | −7.5640E−02 |
| B: | −4.6804E−03 | 5.3929E−03 | −1.0051E−02 | −1.9357E−02 | −1.3425E−03 |
| C: | 3.9942E−04 | −3.8366E−03 | 1.1991E−02 | 7.4354E−03 | 2.0917E−03 |
| D: | 3.6836E−05 | 7.6150E−04 | −8.6366E−03 | −2.0596E−03 | −1.3933E−03 |
| E: | −3.0842E−05 | 1.4384E−03 | 3.2395E−03 | 3.0196E−04 | 4.1796E−04 |
| F: | 6.1779E−06 | −9.2273E−04 | −5.5060E−04 | −1.0752E−05 | −5.9360E−05 |
| G: | −4.3813E−07 | 1.9933E−04 | 2.9672E−05 | −6.1090E−07 | 3.3298E−06 |

| surface | 7 | 8 | 9 | 10 | 11 |
|---|---|---|---|---|---|
| K: | −4.2584E+00 | −5.8959E+00 | −1.3007E−01 | −1.8583E+02 | 1.5726E+02 |
| A: | −1.5752E−02 | 1.7611E−04 | 3.9361E−04 | −1.8686E−02 | −1.5700E−03 |
| B: | 1.3571E−02 | 2.2411E−03 | −1.4468E−03 | −8.5804E−05 | −9.3068E−04 |
| C: | −4.1846E−03 | −1.0030E−04 | 3.2237E−04 | 1.1579E−05 | 6.0150E−04 |
| D: | 4.1577E−04 | −4.3496E−05 | 3.5032E−05 | 1.2675E−04 | −8.5972E−05 |
| E: | 1.3853E−04 | 0.0000E+00 | −1.0904E−05 | −7.3809E−06 | 2.9712E−06 |
| F: | −5.0107E−05 | 0.0000E+00 | 0.0000E+00 | −1.6901E−06 | 1.3616E−06 |
| G: | 4.9000E−06 | 0.0000E+00 | 0.0000E+00 | 9.3205E−08 | −2.0003E−07 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f[mm] | 4.29 | R6/f3 | −0.42 |
| Fno | 2.1 | R7/f34 | 0.31 |
| FOV[deg.] | 77.07 | CT4/T45 | 48.98 |
| R5/CT3 | 5.67 | R7/T34 | 11.00 |
| TD/T12 | 6.21 | |R9/R2| | 9.23 |
| R1/f | 1.59 | f5/f3 | 3.85 |
| f12/CT1 | 4.90 | f/|f5| | 0.25 |
| CT1/CT2 | 0.37 | R2/CT1 | 2.31 |
| R3/T12 | 8.05 | f2/CT2 | 1.52 |

Figure 5A:
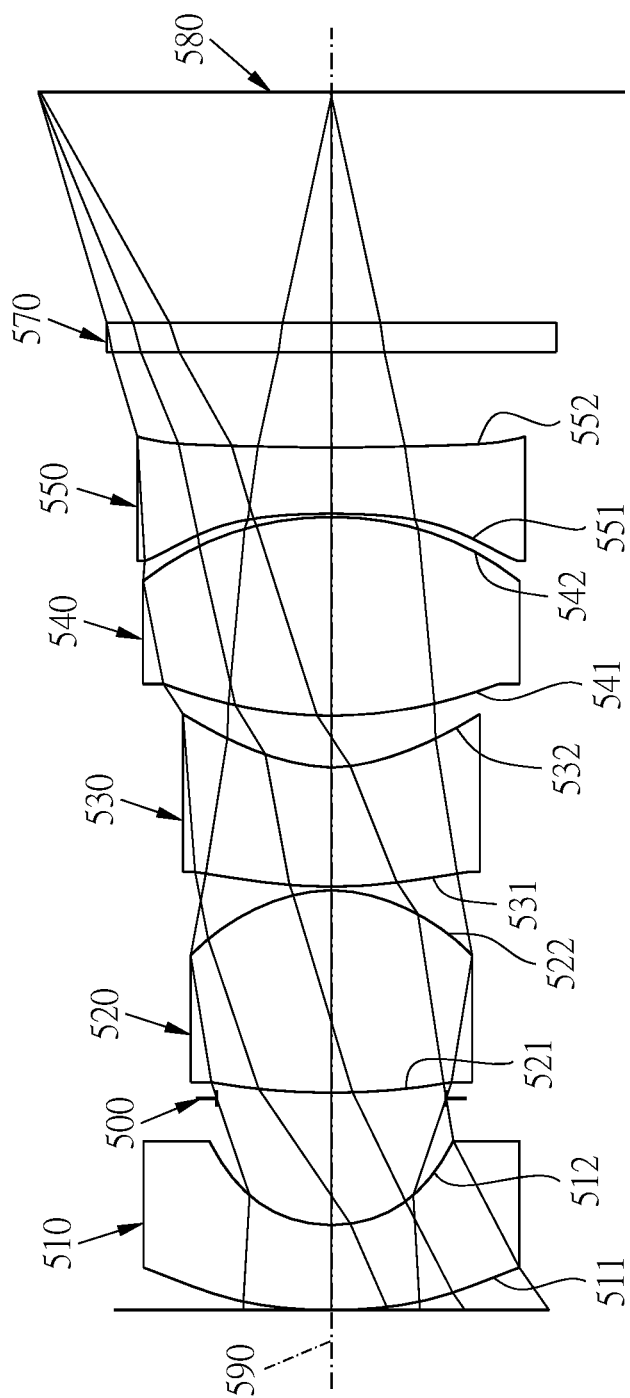
FIG. 5A shows a five-piece infrared single wavelength lens system in accordance with a fifth embodiment of the present invention.
Figure 5B:
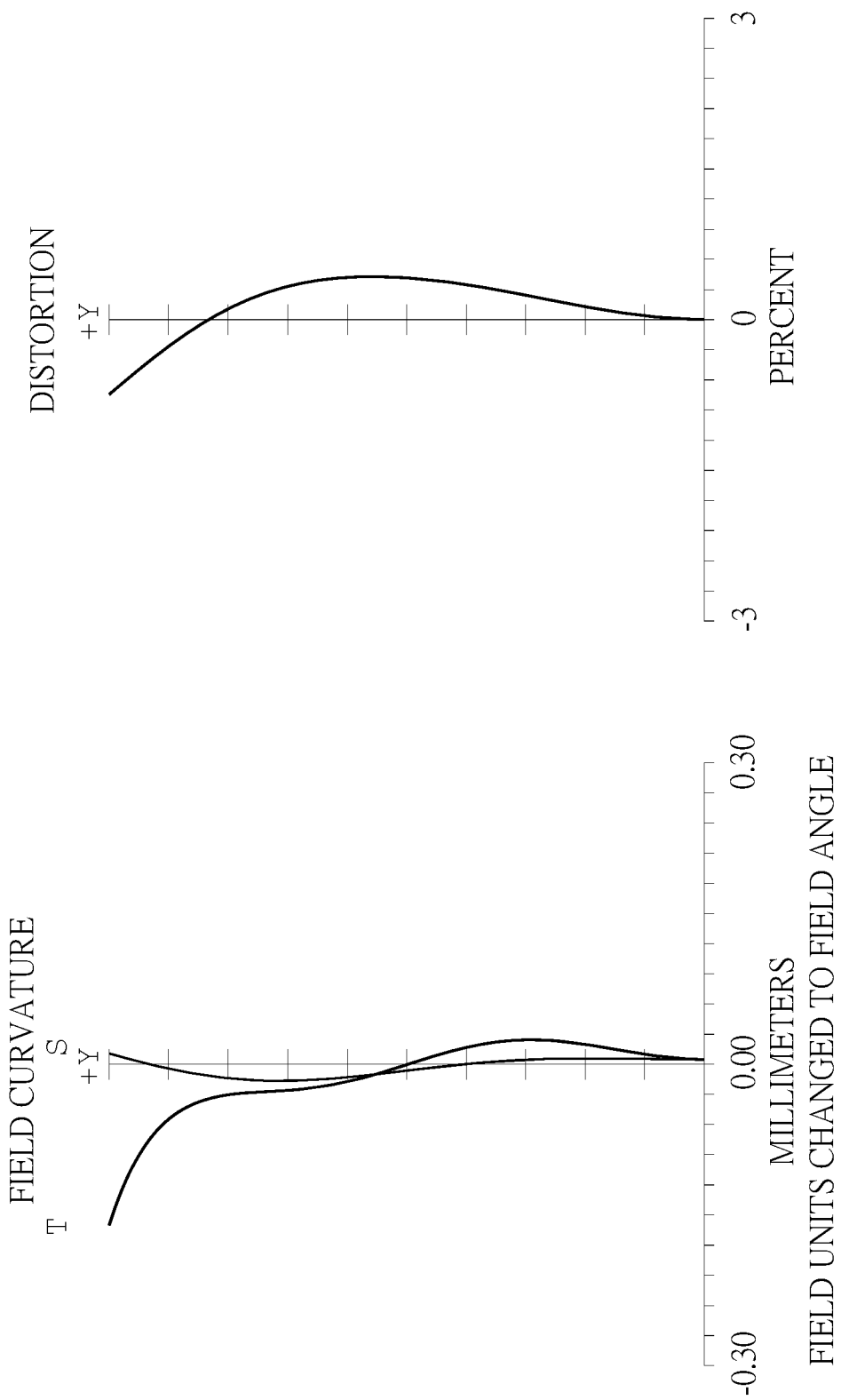
FIG. 5B shows the image plane curve and the distortion curve of the fifth embodiment of the present invention.

Referring to FIGS. 5A and 5B, FIG. 5A shows a five-piece infrared single wavelength lens system in accordance with a fifth embodiment of the present invention, and FIG. 5B shows, in order from left to right, the image plane curve and the distortion curve of the fifth embodiment of the present invention. A five-piece infrared single wavelength lens system in accordance with the fifth embodiment of the present invention comprises a stop 500 and a lens group. The lens group comprises, in order from an object side to an image side: a first lens element 510, a second lens element 520, a third lens element 530, a fourth lens element 540, a fifth lens element 550, an IR band-pass element 570, and an image plane 580, wherein the five-piece infrared single wavelength lens system has a total of five lens elements with refractive power. The stop 500 is disposed between the first lens element 510 and the second lens element 520.

The first lens element 510 with a negative refractive power has an object-side surface 511 being convex near an optical axis 590 and an image-side surface 512 being concave near the optical axis 590, the object-side surface 511 and the image-side surface 512 are aspheric, and the first lens element 510 is made of plastic material.

The second lens element 520 with a positive refractive power has an object-side surface 521 being convex near the optical axis 590 and an image-side surface 522 being convex near the optical axis 590, the object-side surface 521 and the image-side surface 522 are aspheric, and the second lens element 520 is made of plastic material.

The third lens element 530 with a negative refractive power has an object-side surface 531 being convex near the optical axis 590 and an image-side surface 532 being concave near the optical axis 590, the object-side surface 531 and the image-side surface 532 are aspheric, and the third lens element 530 is made of plastic material.

The fourth lens element 540 with a positive refractive power has an object-side surface 541 being convex near the optical axis 590 and an image-side surface 542 being convex near the optical axis 590, the object-side surface 541 and the image-side surface 542 are aspheric, and the fourth lens element 540 is made of plastic material.

The fifth lens element 550 with a negative refractive power has an object-side surface 551 being concave near the optical axis 590 and an image-side surface 552 being concave near the optical axis 590, the object-side surface 551 and the image-side surface 552 are aspheric, and the fifth lens element 550 is made of plastic material.

The IR band-pass element 570 made of glass is located between the fifth lens element 550 and the image plane 580 and has no influence on the focal length of the five-piece infrared single wavelength lens system.

The detailed optical data of the fifth embodiment is shown in table 9, and the aspheric surface data is shown in table 10.

TABLE 9

Embodiment 5
f(focal length) = 4.29 mm, Fno = 2.1, FOV = 77.12 deg.

| surface | | Curvature Radius | Thickness | Material | Index | Abbe # | Focal length |
|---|---|---|---|---|---|---|---|
| 0 | object | infinity | 2000 | | | | |
| 1 | Lens 1 | 7.596 (ASP) | 0.866 | plastic | 1.54 | 56.0 | −4.75 |
| 2 | | 1.832 (ASP) | 1.290 | | | | |
| 3 | stop | infinity | 0.058 | | | | |
| 4 | Lens 2 | 10.361 (ASP) | 2.063 | plastic | 1.54 | 56.0 | 3.20 |
| 5 | | −1.917 (ASP) | 0.036 | | | | |
| 6 | Lens 3 | 6.641 (ASP) | 1.215 | plastic | 1.64 | 22.5 | −4.80 |
| 7 | | 1.918 (ASP) | 0.525 | | | | |
| 8 | Lens 4 | 5.543 (ASP) | 2.026 | glass | 1.69 | 53.2 | 3.93 |
| 9 | | −4.446 (ASP) | 0.035 | | | | |
| 10 | Lens 5 | −11.235 (ASP) | 0.670 | plastic | 1.64 | 22.5 | −12.46 |
| 11 | | 25.732 (ASP) | 0.974 | | | | |
| 12 | IR band-pass element | infinity | 0.300 | glass | | 1.52 | 64.2 |
| 13 | | infinity | 2.350 | | | | |
| 14 | Image plane | infinity | infinity | | | | |

TABLE 10

Aspheric Coefficients

| surface | 1 | 2 | 4 | 5 | 6 |
|---|---|---|---|---|---|
| K: | 4.7524E+00 | −4.3877E−02 | 2.0351E+01 | −6.6820E−01 | 4.4486E+00 |
| A: | 1.7757E−02 | 4.5892E−02 | 7.9620E−03 | 3.7782E−02 | −7.6801E−03 |
| B: | −4.4838E−03 | 5.2528E−03 | −1.0829E−02 | −2.0206E−02 | −1.4553E−03 |
| C: | 3.2464E−04 | −3.6077E−03 | 1.2315E−02 | 7.5468E−03 | 2.0860E−03 |
| D: | 4.9390E−05 | −4.3753E−04 | −9.1609E−03 | −2.1205E−03 | −1.4266E−03 |
| E: | −2.8722E−05 | 1.5141E−03 | 3.4208E−03 | 3.1353E−04 | 4.2637E−04 |
| F: | 5.5068E−06 | −4.1663E−04 | −6.2165E−04 | −1.2523E−05 | −6.4046E−05 |
| G: | −4.0944E−07 | 2.1334E−06 | 4.2760E−05 | −1.2861E−06 | 4.1444E−06 |

| surface | 7 | 8 | 9 | 10 | 11 |
|---|---|---|---|---|---|
| K: | −4.5942E+00 | −8.3499E+00 | 7.8071E−01 | −6.5537E+01 | 1.1668E+02 |
| A: | −1.4066E−02 | −9.5683E−04 | −2.6076E−03 | −2.5300E−02 | −4.3750E−03 |
| B: | 1.3935E−02 | 2.1021E−03 | −8.7479E−04 | 1.5776E−04 | −8.7066E−04 |
| C: | −4.3365E−03 | −1.2226E−04 | 4.0890E−04 | 9.3293E−05 | 5.8880E−04 |
| D: | 4.1008E−04 | −5.0384E−05 | −4.1108E−05 | 1.3285E−04 | −7.7744E−05 |
| E: | 1.4440E−04 | 0.0000E+00 | 0.0000E+00 | −7.4365E−06 | 2.8849E−06 |
| F: | −4.9883E−05 | 0.0000E+00 | 0.0000E+00 | −2.4785E−06 | 7.9615E−07 |
| G: | 4.8962E−06 | 0.0000E+00 | 0.0000E+00 | 2.5995E−07 | −1.2012E−07 |

In the fifth embodiment, the equation of the aspheric surface profiles of the aforementioned lens elements is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f[mm] | 4.29 | R6/f3 | −0.40 |
| Fno | 2.1 | R7/f34 | 0.52 |
| FOV[deg.] | 77.12 | CT4/T45 | 58.62 |
| R5/CT3 | 5.46 | R7/T34 | 10.55 |
| TD/T12 | 6.52 | |R9/R2| | 6.13 |
| R1/f | 1.77 | f5/f3 | 2.60 |
| f12/CT1 | 4.49 | f/|f5| | 0.34 |
| CT1/CT2 | 0.42 | R2/CT1 | 2.12 |
| R3/T12 | 7.69 | f2/CT2 | 1.55 |

In the present five-piece infrared single wavelength lens system, the lens elements can be made of plastic or glass. If the lens elements are made of plastic, the cost will be effectively reduced. If the lens elements are made of glass, there is more freedom in distributing the refractive power of the five-piece infrared single wavelength lens system. Plastic lens elements can have aspheric surfaces, which allow more design parameter freedom (than spherical surfaces), so as to reduce the aberration and the number of the lens elements, as well as the total track length of the five-piece infrared single wavelength lens system.

In the present five-piece infrared single wavelength lens system, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The five-piece infrared single wavelength lens system of the present invention can be used in focusing optical systems and can obtain better image quality. The five-piece infrared single wavelength lens system of the present invention can also be used in electronic imaging systems, such as, 3D image capturing, digital camera, mobile device, digital flat panel or vehicle camera.

While we have shown and described various embodiments in accordance with the present invention, it should be clear to those skilled in the art that further embodiments may be made without departing from the scope of the present invention.

What is claimed is:

1. A five-piece infrared single wavelength lens system comprising a stop and a lens group having five lens elements, in order from an object side to an image side:

a first lens element with a negative refractive power, having an object-side surface being convex near an optical axis and an image-side surface being concave near the optical axis, at least one of the object-side surface and the image-side surface of the first lens element being aspheric;

the stop;

a second lens element with a positive refractive power, having an object-side surface being convex near the optical axis and an image-side surface being convex near the optical axis, at least one of the object-side surface and the image-side surface of the second lens element being aspheric;

a third lens element with a negative refractive power, having an object-side surface being convex near the optical axis and an image-side surface being concave near the optical axis, at least one of the object-side surface and the image-side surface of the third lens element being aspheric;

a fourth lens element with a positive refractive power, having an object-side surface being convex near the optical axis and an image-side surface being convex near the optical axis;

a fifth lens element with a negative refractive power, having an object-side surface being concave near the optical axis and an image-side surface being concave near the optical axis, at least one of the object-side surface and the image-side surface of the fifth lens element being aspheric;

wherein a radius of curvature of the object-side surface of the third lens element is R5, a central thickness of the third lens element along the optical axis is CT3, a central thickness of the fourth lens element along the optical axis is CT4, a distance along the optical axis between the fourth lens element and the fifth lens element is T45, and they satisfy the relations: 5<R5/CT3<35, and 14<CT4/T45<59.

2. The five-piece infrared single wavelength lens system as claimed in claim 1, wherein a distance from the object-side surface of the first lens element to the image-side surface of the fifth lens element along the optical axis is TD, a distance along the optical axis between the first lens element and the second lens element is T12, and they satisfy the relation: 2.5<TD/T12<7.

3. The five-piece infrared single wavelength lens system as claimed in claim 1, wherein a radius of curvature of the object-side surface of the first lens element is R1, a focal length of the five-piece infrared single wavelength lens system is f, and they satisfy the relation: −0.7<R1/f<4.3.

4. The five-piece infrared single wavelength lens system as claimed in claim 1, wherein a focal length of the first lens element and the second lens element combined is f12, a central thickness of the first lens element along the optical axis is CT1, and they satisfy the relation: 1.2<f12/CT1<9.2.

5. The five-piece infrared single wavelength lens system as claimed in claim 1, wherein a central thickness of the first lens element along the optical axis is CT1, a central thickness of the second lens element along the optical axis is CT2, and they satisfy the relation: 0.25<CT1/CT2<0.95.

6. The five-piece infrared single wavelength lens system as claimed in claim 1, wherein a radius of curvature of the object-side surface of the second lens element is R3, a distance along the optical axis between the first lens element and the second lens element is T12, and they satisfy the relation: 0.6<R3/T12<8.6.

7. The five-piece infrared single wavelength lens system as claimed in claim 1, wherein a radius of curvature of the image-side surface of the third lens element is R6, a focal length of the third lens element is f3, and they satisfy the relation: −0.55<R6/f3<−0.35.

8. The five-piece infrared single wavelength lens system as claimed in claim 1, wherein a radius of curvature of the object-side surface of the fourth lens element is R7, a focal length of the third lens element and the fourth lens element combined is f34, and they satisfy the relation: $0.3<R7/f34<1.3$.

9. The five-piece infrared single wavelength lens system as claimed in claim 1, wherein a radius of curvature of the object-side surface of the fourth lens element is R7, a distance along the optical axis between the third lens element and the fourth lens element is T34, and they satisfy the relation: $10<R7/T34<33$.

10. The five-piece infrared single wavelength lens system as claimed in claim 1, wherein a radius of curvature of the object-side surface of the fifth lens element is R9, a radius of curvature of the image-side surface of the first lens element is R2, and they satisfy the relation: $6<|R9/R2|<84$.

11. The five-piece infrared single wavelength lens system as claimed in claim 1, wherein a focal length of the fifth lens element is f5, a focal length of the third lens element is f3, and they satisfy the relation: $2.3<f5/f3<11.5$.

12. The five-piece infrared single wavelength lens system as claimed in claim 1, wherein a focal length of the five-piece infrared single wavelength lens system is f, a focal length of the fifth lens element is f5, and they satisfy the relation: $0.07<f/|f5|<0.4$.

13. The five-piece infrared single wavelength lens system as claimed in claim 1, wherein a radius of curvature of the image-side surface of the first lens element is R2, a central thickness of the first lens element along the optical axis is CT1, and they satisfy the relation: $1<R2/CT1<3.5$.

14. The five-piece infrared single wavelength lens system as claimed in claim 1, wherein a focal length of the second lens element is f2, a focal length of the first lens element and the second lens element combined is f12, and they satisfy the relation: $0.7<f2/f12<1.5$.

* * * * *